(12) United States Patent
Otani et al.

(10) Patent No.: US 11,773,286 B2
(45) Date of Patent: Oct. 3, 2023

(54) COMPOSITE LAMINATE AND METHOD FOR PRODUCING SAME, AND METAL RESIN BONDED PRODUCT AND METHOD FOR PRODUCING SAME

(71) Applicant: RESONAC CORPORATION, Tokyo (JP)

(72) Inventors: Kazuo Otani, Kumagaya (JP); Shinji Numao, Kumagaya (JP)

(73) Assignee: Resonac Corporation, Tokyo (JP)

( * ) Notice: Subject to any disclaimer, the term of this patent is extended or adjusted under 35 U.S.C. 154(b) by 295 days.

(21) Appl. No.: 16/770,791

(22) PCT Filed: Nov. 27, 2018

(86) PCT No.: PCT/JP2018/043493
§ 371 (c)(1),
(2) Date: Jun. 8, 2020

(87) PCT Pub. No.: WO2019/116879
PCT Pub. Date: Jun. 20, 2019

(65) Prior Publication Data
US 2021/0179885 A1 Jun. 17, 2021

(30) Foreign Application Priority Data
Dec. 13, 2017 (JP) ................................. 2017-238217

(51) Int. Cl.
| | |
|---|---|
| *C09D 171/12* | (2006.01) |
| *B05D 3/10* | (2006.01) |
| *B05D 3/12* | (2006.01) |
| *B05D 7/16* | (2006.01) |
| *B32B 15/20* | (2006.01) |
| *B32B 15/18* | (2006.01) |
| *B32B 15/09* | (2006.01) |
| *B29C 45/14* | (2006.01) |
| *B32B 15/092* | (2006.01) |
| *B32B 27/38* | (2006.01) |
| *C08L 63/08* | (2006.01) |
| *B29K 69/00* | (2006.01) |
| *B29K 705/02* | (2006.01) |

(52) U.S. Cl.
CPC ........... *C09D 171/12* (2013.01); *B05D 3/102* (2013.01); *B05D 3/12* (2013.01); *B05D 7/16* (2013.01); *B29C 45/14311* (2013.01); *B32B 15/09* (2013.01); *B32B 15/092* (2013.01); *B32B 15/18* (2013.01); *B32B 15/20* (2013.01); *B32B 27/38* (2013.01); *C08L 63/08* (2013.01); *B29C 2045/14868* (2013.01); *B29K 2069/00* (2013.01); *B29K 2705/02* (2013.01); *B32B 2255/26* (2013.01); *B32B 2605/08* (2013.01)

(58) Field of Classification Search
CPC ........ C09D 171/12; B05D 3/102; B05D 7/16; B32B 15/09; B32B 15/092; B32B 15/18; B32B 15/20; B32B 27/38; B32B 2255/26; C08L 63/08; B29K 2069/00; B29K 2705/02
See application file for complete search history.

(56) References Cited

U.S. PATENT DOCUMENTS

| | | | | |
|---|---|---|---|---|
| 3,593,848 | A | * 7/1971 | Landau | ................. B05D 7/546 427/178 |
| 4,628,004 | A | 12/1986 | Nickola et al. | |
| 5,166,251 | A | 11/1992 | Barrett et al. | |
| 2006/0204734 | A1 | 9/2006 | Watanabe et al. | |
| 2018/0067408 | A1* | 3/2018 | Hoshizaki | ............. G03G 5/144 |

FOREIGN PATENT DOCUMENTS

| | | |
|---|---|---|
| CA | 1 179 558 A | 12/1984 |
| EP | 3 564 029 A1 | 11/2019 |
| FR | 2 500 371 A1 | 8/1982 |
| JP | 6-264042 A | 9/1994 |
| JP | 10-251613 A | 9/1998 |
| JP | 2006-213677 A | 8/2006 |
| JP | 2008-238014 A | 10/2008 |
| JP | 2010-125722 A | 6/2010 |
| JP | 2010-131888 A | 6/2010 |
| JP | 4541153 B2 | 9/2010 |
| JP | 2012-041579 A | 3/2012 |
| JP | 2016-016584 A | 2/2016 |
| JP | 2016-088010 A | 5/2016 |
| JP | 2017-001378 A | 1/2017 |
| JP | 2017-203212 A | 11/2017 |
| WO | 99/14277 A1 | 3/1999 |
| WO | 2017/094633 A1 | 6/2017 |
| WO | 2017/195811 A1 | 11/2017 |
| WO | 2018/124215 A1 | 7/2018 |

OTHER PUBLICATIONS

Extended European Search Report dated Jul. 21, 2021 in Application No. 18889896.9.
International Search Report of PCT/JP2018/043493 dated Feb. 19, 2019 [PCT/ISA/210].

* cited by examiner

*Primary Examiner* — Callie E Shosho
*Assistant Examiner* — Bethany M Miller
(74) *Attorney, Agent, or Firm* — Sughrue Mion, PLLC

(57) ABSTRACT

To provide a composite laminate having excellent adhesiveness to a resin material imparted to a metal base material, such as an aluminum, and a method for producing the same, and a metal-resin bonded article using the composite laminate and a method for producing the same. A composite laminate 1 includes a metal base material 2 and one layer or plural layers of a resin coating layer 4 laminated on the metal base material 2, the resin coating layer 4 is laminated on a surface-treated surface of the metal base material 2, and at least one layer of the resin coating layer 4 is formed of a resin composition containing an in situ polymerizable phenoxy resin.

19 Claims, 1 Drawing Sheet

[Fig. 1]
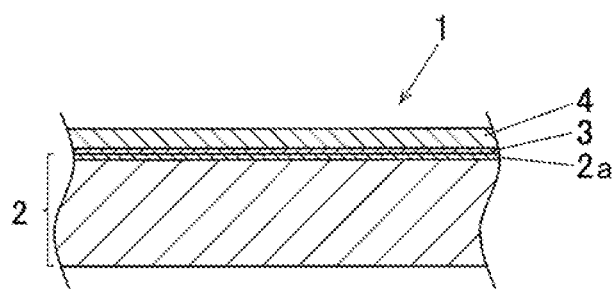
[Fig. 2]
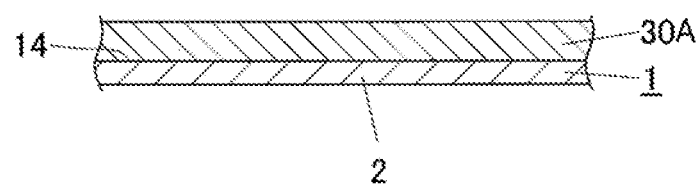
[Fig. 3]
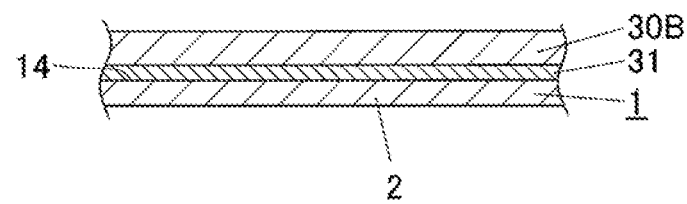

US 11,773,286 B2

COMPOSITE LAMINATE AND METHOD FOR PRODUCING SAME, AND METAL RESIN BONDED PRODUCT AND METHOD FOR PRODUCING SAME

CROSS REFERENCE TO RELATED APPLICATIONS

This application is a National Stage of International Application No. PCT/JP2018/043493, filed Nov. 27, 2018, claiming priority to Japanese Patent Application No. 2017-238217, filed Dec. 13, 2017.

TECHNICAL FIELD

The present invention relates to a composite laminate including a metal base material that is suitable for bonding the metal base material to a resin material, and a method for producing the same, and to a metal-resin bonded article using the composite laminate, and a method for producing the same.

BACKGROUND ART

In the fields requiring weight reduction in automobile components, OA equipments, and the like, there are frequently cases using a composite material including a metal material, such as aluminum, and a resin, which are firmly bonded and integrated to each other. In the case where aluminum is used as the metal material in the composite material, it is the current practice that the aluminum material is subjected to a surface treatment for sufficiently securing the bonding strength.

As for the surface treatment of the aluminum material, a physical method, such as a shotblasting treatment, has been generally used, which however is inferior in productivity and is not suitable for articles having a thin shape or a complicated shape, and therefore the application of a chemical surface treatment to the aluminum material is being currently studied instead of the physical method.

For example, a chemical surface treatment method has been known, in which a metal surface film is formed on a surface of an aluminum material, which is then made into contact with an etching solution to form a porous etched layer on the surface of the material (see PTL 1). A method has also been known, in which an underlayer treatment film is provided on a surface of a base material formed of an aluminum alloy, and an adhesive layer containing a modified polypropylene resin having a polar group introduced thereto is formed thereon (see PTL 2). A method has also been known, in which an aluminum material is dipped in an electrolytic bath of phosphoric acid or sodium hydroxide to form an anodically oxidized film having pores, in which at least 85% of the pores that open on the surface thereof have a diameter of 25 to 90 nm, and a molten synthetic resin is injection molded on the surface having the anodically oxidized film formed thereon, so as to enhance the adhesion strength through the anchoring effect (see PTL 3).

There has been also proposed a method, in which an uneven thin film of a metal oxide or a metal phosphate is formed on a fine uneven surface formed by subjecting a surface of an aluminum material to an etching treatment (see PTL 4).

There has been also proposed use of a surface reactive solid material (such as a metal material), which is produced in such a manner that a solid material, such as a metal material or a ceramic material, is dipped in a solution containing a water soluble alkoxysilane-containing triazinedithiol metal salt, so as to make the water soluble alkoxysilane-containing triazinedithiol metal salt attached to the surface of the solid material (see PTL 5).

A metal-resin composite molded article has been also known, which includes a polypropylene resin layer that is bonded to a metal base material through a hydrophilic surface formed on the metal base material, and a thermoplastic resin molded article is bonded to the polypropylene resin layer through solubilization with the polypropylene resin layer and an anchoring effect (see PTL 6).

CITATION LIST

Patent Literatures

PTL 1: JP 2012-41579 A
PTL 2: JP 2016-16584 A
PTL 3: Japanese Patent No. 4,541,153
PTL 4: JP 2010-131888 A
PTL 5: JP 2006-213677 A
PTL 6: JP 2017-1378 A

SUMMARY OF INVENTION

Technical Problem

The surface-treated aluminum materials of PTLs 1 to 3 can be favorably bonded to a bonding target of various materials (such as a metal material and an organic material), but have a problem that it is difficult to provide a sufficient bonding strength in the case where the aluminum material after elapse of a long period of time, such as storing, is bonded to a bonding target. For example, in the case where the surface-treated aluminum material is delivered to a molding manufacturer and is bonded to a bonding target in the molding manufacturer, a certain period of time is often elapsed for inspection, transportation, storing, and the like, and there is a problem that it is difficult to provide a sufficient bonding strength in the case where the surface-treated aluminum material is bonded to a bonding target after elapse of a long period of time.

The technique described in PTL 4 employs the surface treatment process for forming the uneven thin film of a metal oxide or a metal phosphate includes a chemical etching step of dipping an aluminum alloy in a strongly basic aqueous solution, a neutralizing step of dipping the aluminum alloy in an acidic aqueous solution, and a fine etching step of dipping the aluminum alloy in an aqueous solution containing one or more kind selected from hydrated hydrazine, ammonia, and a water soluble amine compound (see claim 8 of PTL 4), and therefore there is a problem that the waste liquid treatment is necessarily performed for hydrated hydrazine, ammonia, and a water soluble amine compound after use thereof.

In the technique described in PTL 5, the water soluble alkoxysilane-containing triazinedithiol metal salt is attached to a solid surface to achieve favorable bonding to a bonding target of a material of a different kind, but there is a problem that it is difficult to provide a sufficient bonding strength in the case where the surface reactive solid material (such as a metal material) having the water soluble alkoxysilane-containing triazinedithiol metal salt attached thereto is bonded to a bonding target after elapse of a long period of time, such as transportation and storing.

In the technique described in PTL 6, it is difficult to provide a sufficient bonding strength since the thermoplastic resin has a high viscosity even after melting, and the thermoplastic resin cannot sufficiently enter the fine pores (unevenness) on the surface of the metal base material.

The present invention has been made in view of the aforementioned technical background, and an object thereof is to provide a composite laminate that is capable of imparting excellent adhesiveness to a resin material to a surface of a metal base material, such as an aluminum material, and a method for producing the same. Another object thereof is to provide a metal-resin bonded article using the composite laminate, and a method for producing the same.

Solution to Problem

For achieving the objects, the present invention provides the following measures.

[1] A composite laminate comprising a metal base material and one layer or plural layers of a resin coating layer laminated on the metal base material, the resin coating layer being laminated on a surface-treated surface of the metal base material, at least one layer of the resin coating layer being formed of a resin composition containing an in situ polymerizable phenoxy resin.

[2] The composite laminate according to the item [1], wherein the resin coating layer includes plural layers, at least one layer of which is formed of a resin composition containing a thermosetting resin, and the thermosetting resin is at least one kind selected from the group consisting of a urethane resin, an epoxy resin, a vinyl ester resin, and an unsaturated polyester resin.

[3] The composite laminate according to the item [1] or [2], wherein the composite laminate includes a functional group adherent layer between the surface-treated surface of the metal base material and the resin coating layer, the functional group adherent layer is laminated in contact with the metal base material and the resin coating layer, and the functional group adherent layer has a functional group introduced from at least one kind selected from the group consisting of a silane coupling agent, an isocyanate compound, and a thiol compound.

[4] The composite laminate according to any one of the items [1] to [3], wherein the surface treatment is at least one kind selected from the group consisting of a blast treatment, a grinding treatment, an etching treatment, and a chemical conversion treatment.

[5] The composite laminate according to any one of the items [1] to [4], wherein the metal base material contains aluminum.

[6] The composite laminate according to the item [4], wherein the metal base material contains aluminum, and the surface treatment includes at least one kind of an etching treatment and a boehmite treatment.

[7] The composite laminate according to any one of the items [1] to [4], wherein the metal base material contains a metal selected from the group consisting of iron, titanium, magnesium, a stainless steel, and copper.

[8] The composite laminate according to any one of the items [1] to [7], wherein the resin coating layer is a primer layer.

[9] A method for producing the composite laminate according to any one of the items [1] to [8], comprising subjecting the resin composition containing an in situ polymerizable phenoxy resin to polyaddition reaction on the surface-treated surface of the metal base material, so as to form at least one layer of the resin coating layer.

[10] The method for producing the composite laminate according to the item [9], wherein the surface treatment is at least one kind selected from the group consisting of a blast treatment, a grinding treatment, an etching treatment, and a chemical conversion treatment.

[11] The method for producing the composite laminate according to the item [9] or [10], further comprising, before forming the resin coating layer, treating the surface-treated surface of the metal base material with at least one kind selected from the group consisting of a silane coupling agent, an isocyanate compound, and a thiol compound, so as to form a functional group adherent layer.

[12] A metal-resin bonded article comprising the composite laminate according to the item [8] and a resin material bonded and integrated to a surface on a side of the primer layer of the composite laminate.

[13] A method for producing the metal-resin bonded article according to the item [12], comprising bonding and integrating a resin material to a side of the primer layer of the composite laminate, through molding the resin material by at least one method selected from the group consisting of injection molding, press molding, filament winding molding, and hand lay-up molding.

Advantageous Effects of Invention

According to the present invention, a composite laminate having excellent adhesiveness to a resin material imparted to a surface of a metal base material can be provided.

A metal-resin bonded article that is bonded with a high adhesion strength can be provided by using the composite laminate.

BRIEF DESCRIPTION OF DRAWINGS

FIG. 1 is a cross sectional view schematically showing one embodiment of the composite laminate of the present invention.

FIG. 2 is a cross sectional view schematically showing one embodiment of the metal-resin bonded article of the present invention.

FIG. 3 is a cross sectional view schematically showing another embodiment of the metal-resin bonded article of the present invention.

DESCRIPTION OF EMBODIMENTS

The composite laminate and the method for producing the same, and the metal-resin bonded article using the composite laminate and the method for producing the same of the present invention will be described in detail.

[Composite Laminate]

The composite laminate of the present invention is a composite laminate including a metal base material and one layer or plural layers of a resin coating layer laminated on the metal base material. The resin coating layer is laminated on a surface-treated surface of the metal base material, and at least one layer of the resin coating layer is formed of a resin composition containing an in situ polymerizable phenoxy resin.

The composite laminate can exhibits excellent adhesiveness to a resin material through the resin coating layer laminated on the metal base material.

FIG. 1 shows one embodiment of the composite laminate. A composite laminate 1 shown in FIG. 1 has a structure, in which a functional group adherent layer 3 provided on a surface of a surface-treated part 2a formed on a surface of a metal base material 2, and a resin coating layer 4 is provided on a surface of the functional group adherent layer 3. The functional group adherent layer 3 may not be necessarily provided between the metal base material 2 and the resin coating layer 4. Accordingly, the resin coating layer 4 on the surface of the metal base material 2 may be laminated directly on the surface of the surface-treated part 2*a*.

<Metal Base Material>

The metal base material 2 is not particularly limited in the metal species thereof, and examples thereof include aluminum, iron, titanium, magnesium, a stainless steel, and copper. Among these, aluminum is particularly favorably used from the standpoint of the lightweight property, the workability, and the like.

In the present invention, the word "aluminum" is used as the meaning that includes aluminum and alloys thereof. Similarly, iron, titanium, magnesium, and copper are also used as the meaning that includes the elemental substance and alloys thereof.

<Surface Treatment (Surface-Treated Part)>

The surface-treated part 2*a* is formed on the surface of the metal base material 2. The surface-treated part 2*a* is assumed to be a part of the metal base material 2.

Examples of the surface treatment include a cleaning or degreasing treatment with a solvent or the like, a blast treatment, a grinding treatment, an etching treatment, and a chemical conversion treatment, and a surface treatment that forms hydroxy groups on the surface of the metal base material 2 is preferred. The treatments may be used alone, or two or more kinds thereof may be performed in combination. The specific method of the surface treatment used may be a known method.

The surface treatment cleans the surface of the metal base material 2 or roughens the surface thereof through the formation of fine unevenness intending to achieve an anchoring effect. Therefore, the surface treatment can enhance the adhesiveness between the surface of the metal base material 2 and the resin coating layer 4 and can contribute to the enhancement of the adhesiveness to a bonding target of various materials (such as a metal material and an organic material).

Accordingly, in the production of the composite laminate 1, the metal base material 2 is subjected to the surface treatment before the formation of the resin coating layer 4. The surface treatment is preferably at least one kind selected from the group consisting of a blast treatment, a grinding treatment, an etching treatment, and a chemical conversion treatment.

The surface treatment in the case where the metal base material 2 is aluminum is particularly preferably an etching treatment and/or a boehmite treatment.

[Cleaning or Degreasing Treatment]

Examples of the cleaning or degreasing treatment with a solvent or the like include a method of degreasing the surface of the metal base material 2 by washing or wiping with an organic solvent, such as acetone and toluene. The cleaning or degreasing treatment is preferably performed before the other surface treatments.

[Blast Treatment]

Examples of the blast treatment include shotblasting and sandblasting.

[Grinding Treatment]

Examples of the grinding treatment include buff grinding using abrasive cloth, roll grinding using abrasive paper (sandpaper), and electrolytic grinding.

[Etching Treatment]

Examples of the etching treatment include a chemical etching treatment, such as an alkali method, a phosphoric acid-sulfuric acid method, a fluoride method, a chromic acid-sulfuric acid method, and a salt iron method, and an electrochemical etching method, such as an electrolytic etching method.

The etching treatment in the case where the metal base material 2 is aluminum is preferably an alkali method using a sodium hydroxide aqueous solution or a potassium hydroxide aqueous solution, and particularly preferably a caustic soda method using a sodium hydroxide aqueous solution.

The alkali method may be performed, for example, by dipping the aluminum base material in an aqueous solution of sodium hydroxide or potassium hydroxide having a concentration of 3 to 20% by mass at 20 to 70° C. for 1 to 15 minutes. An additive, such as a chelating agent, an oxidizing agent, and a phosphate salt, may be added. After dipping, the base material is preferably neutralized with a nitric acid aqueous solution of 5 to 20% by mass (desmutting), washed with water, and dried.

[Chemical Conversion Treatment]

The chemical conversion treatment forms a chemical film as the surface-treated part 2*a* mainly on the surface of the metal base material 2.

Examples of the chemical conversion treatment in the case where the metal base material 2 is aluminum include a boehmite treatment and a zirconium treatment, and a boehmite treatment is particularly preferred.

In the boehmite treatment, the aluminum base material is subjected to a hydrothermal treatment to form a boehmite film on the surface of the base material. A reaction accelerator, such as ammonia and triethanolamine, may be added to water. For example, it is preferred that the aluminum base material is dipped in hot water at 90 to 100° C. containing triethanolamine in a concentration of 0.1 to 5.0% by mass for 3 seconds to 5 minutes.

In the zirconium treatment, the aluminum base material is dipped, for example, in a liquid containing a zirconium salt, such as zirconium phosphate, to form a film of a zirconium compound on the surface of the base material. For example, it is preferred that the aluminum base material is dipped in a liquid of a chemical agent for a zirconium treatment (for example, "Palcoat 3762" and "Palcoat 3796", produced by Nihon Parkerizing Co., Ltd.) at 45 to 70° C. for 0.5 to 3 minutes. The zirconium treatment is preferably performed after the etching treatment by the caustic soda method.

<Functional Group Adherent Layer>

It is also preferred that a functional group adherent layer 3 is laminated between and in contact with the surface-treated surface of the metal base material 2 and the resin coating layer 4. The functional group adherent layer 3 is a layer having a functional group introduced from at least one kind selected from the group consisting of a silane coupling agent, an isocyanate compound, and a thiol compound.

The layer having a functional group that is formed between the surface-treated surface of the metal base material 2 and the resin coating layer 4 may provide an effect of enhancing the adhesiveness between the surface of the metal base material 2 and the resin coating layer 4 through the chemical bond formed by reacting the functional group, and also can contribute to the enhancement of the adhesiveness to a bonding target.

Accordingly, it is preferred that in the production of the composite laminate 1, before the formation of the resin coating layer 4, the surface-treated surface of the metal base material 2 is treated with at least one kind selected from the group consisting of a silane coupling agent, an isocyanate compound, and a thiol compound, so as to form the functional group adherent layer 3.

The metal base material 2 can have, due to the surface-treated part 2a formed thereon, enhanced adhesiveness between the surface of the metal base material 2 and the resin coating layer 4 and enhanced adhesiveness to a bonding target through the synergistic effect of the anchoring effect through the fine unevenness of the surface-treated part 2a and the chemical bond formed by reacting the functional group of the functional group adherent layer 3.

The method of forming the functional group adherent layer 3 with the silane coupling agent, the isocyanate compound, or the thiol compound is not particularly limited, and examples thereof include a spray coating method and a dipping method. Specifically, for example, such a method may be employed that the metal base material is dipped in a solution of the silane coupling agent or the like having a concentration of 5 to 50% by mass at ordinary temperature to 100° C. for 1 minute to 5 days, and then dried at ordinary temperature to 100° C. for 1 minutes to 5 hours.

[Silane Coupling Agent]

The silane coupling agent used may be, for example, a known one that is used for a surface treatment of glass fibers or the like. A silanol group formed through hydrolysis of the silane coupling agent or a silanol group obtained through oligomerization thereof is reacted with and bonded to the hydroxy group existing on the surface-treated surface of the metal base material 2, and thereby the functional group based on the structure of the silane coupling agent capable of chemically bonding to the resin coating layer 4 and the bonding target can be imparted to (introduced to) the metal base material 2.

The silane coupling agent is not particularly limited, and examples thereof include vinyltrimethoxysilane, vinyltriethoxysilane, 2-(3,4-ep oxycyclohexyl)ethyltrimethoxysilane, 3-glycidoxypropylmethyldimethoxysilane, 3-glycidoxypropylmethyltrimethoxysilane, 3-glycidoxypropylmethyldiethoxysilane, 3-glycidoxypropylmethyldiethoxysilane, 3-glycidoxypropyltriethoxysilane, p-stylyltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, a hydrochloride of N-(vinylbenzyl)-2-aminopropyltrimethoxysilane, tris(trimethoxysilylpropyl) isocyanurate, 3-ureidopropyltrialkoxysilane, 3-mercaptopropylmethyldimethoxysilane, 3-isocyanatopropyltriethoxysilane, and dithioltriazinepropyltriethoxysilane. These compounds may be used alone or as a combination of two or more kinds thereof.

[Isocyanate Compound]

The isocyanato group in the isocyanate compound is reacted with and bonded to the hydroxy group existing on the surface-treated surface of the metal base material 2, and thereby the functional group based on the structure of the isocyanate compound capable of chemically bonding to the resin coating layer 4 and the bonding target can be imparted to (introduced to) the metal base material 2 by the isocyanate compound.

The isocyanate compound is not particularly limited, and examples thereof include a polyfunctional isocyanate, such as diphenylmethane diisocyanate (MDI), hexamethylene diisocyanate (HDI), tolylene diisocyanate (TDI), and isophorone diisocyanate (IPDI), and also include an isocyanate compound having a radically reactive group, such as 2-isocyanatoethyl methacrylate (e.g., "Karenz MOI (registered trademark)", produced by Showa Denko K.K.), 2-isocyanatoethyl acrylate (e.g., "Karenz AOI (registered trademark)" and "Karenz AOI-VM (registered trademark)", produced by Showa Denko K.K.), and 1,1-(bisacryloyloxyethyl)ethyl isocyanate (e.g., "Karenz BEI (registered trademark)", produced by Showa Denko K.K.).

[Thiol Compound]

The mercapto group (thiol group) in the thiol compound is reacted with and bonded to the hydroxy group existing on the surface-treated surface of the metal base material 2, and thereby the functional group based on the structure of the thiol compound capable of chemically bonding to the resin coating layer 4 and the bonding target can be imparted to (introduced to) the metal base material 2 by the thiol compound.

The thiol compound is not particularly limited, and examples thereof include pentaerythritol tetrakis(3-mercaptopropionate) (e.g., "QX40", produced by Mitsubishi Chemical Corporation and "QE-340M", produced by Toray Fine Chemicals Co., Ltd.), an ether based primary thiol (e.g., "Cupcure 3-800", produced by Cognis GmbH), 1,4-bis(3-mercaptobutyryloxy)butane (e.g., "Karenz MT (registered trademark) BD1", produced by Showa Denko K.K.), pentaerythritol tetrakis(3-mercaptobutyrate) (e.g., "Karenz MT (registered trademark) PE1", produced by Showa Denko K.K.), and 1,3,5-tris(3-mercaptobutyloxyethyl)-1,3,5-triazin-2,4,6-(1H, 3H, 5H)-trione (e.g., "Karenz MT (registered trademark) NR1", produced by Showa Denko K.K.).

<Resin Coating Layer>

The resin coating layer 4 is laminated on the surface-treated surface of the metal base material 2, i.e., the surface of the surface-treated part 2a of the metal base material 2, or alternatively may be laminated on the surface of the functional group adherent layer 3.

The resin coating layer 4 may be constituted by one layer or may be constituted by plural layers including two or more layers.

The resin coating layer 4 is formed on the surface-treated surface of the metal base material 2 with excellent adhesiveness, with which the surface of the metal base material 2 is protected, and the attachment of contamination and the degradation, such as oxidation, on the surface of the metal base material 2 can be suppressed.

The resin coating layer 4 can impart excellent adhesiveness to the bonding target of various materials (such as a metal material and an organic material), particularly to a resin material, to the surface of the metal base material 2. Furthermore, the composite laminate can be obtained that can retain the state capable of providing excellent adhesiveness for a prolonged period of several months in the state where the surface of the metal base material 2 is protected.

In the composite laminate 1, as described above, the resin coating layer 4 can impart excellent adhesiveness to the bonding target to the metal base material 2, and therefore is preferably a primer layer of the composite laminate 1.

The primer layer referred herein means the layer that intervenes between the metal base material 2 and the bonding target and enhances the adhesiveness between the metal base material 2 and the bonding target in the case where the metal base material 2 is bonded and integrated to the bonding target, such as a resin material, for example, in the metal-resin bonded article described later.

(In Situ Polymerizable Phenoxy Resin)

At least one layer of the resin coating layer 4 is a layer formed of a resin composition containing an in situ polymerizable phenoxy resin (which may be hereinafter referred to as an in situ polymerizable phenoxy resin layer).

The in situ polymerizable phenoxy resin is a resin that is also referred to as a thermoplastic epoxy resin, an in situ curable phenoxy resin, an in situ curable epoxy resin, or the like, and forms a thermoplastic structure, i.e., a linear polymer structure, through polyaddition reaction of a bifunctional epoxy resin and a bifunctional phenol compound in the presence of a catalyst. Accordingly, the resin coating layer 4 having thermoplasticity can be formed, as different from a thermosetting resin constituting a three-dimensional network through a crosslinked structure.

Due to these characteristics, the in situ polymerizable phenoxy resin can form the resin coating layer 4 having excellent adhesiveness to the metal base material 2 by in situ polymerization, and can impart excellent adhesiveness to the bonding target to the resin coating layer 4.

Accordingly, in the production of the composite laminate 1, it is preferred that the resin composition containing an in situ polymerizable phenoxy resin is subjected to polyaddition reaction on the surface-treated surface of the metal base material 2, so as to form at least one layer of the resin coating layer 4.

The polyaddition reaction of the resin composition containing the in situ polymerizable phenoxy resin is preferably performed on the surface of the functional group adherent layer, and is also preferably performed on the surface of the other layer than the in situ polymerizable phenoxy resin layer of the resin coating layer 4. The resin coating layer 4 that includes the in situ polymerizable phenoxy resin layer formed in this embodiment has excellent adhesiveness to the metal base material 2 and also has excellent adhesiveness to the bonding target.

The coating method for forming the resin coating layer 4 with the resin composition is not particularly limited, and examples thereof include a spray coating method and a dipping method.

The resin composition may contain a solvent and depending on necessity additives, such as a colorant, for sufficiently performing the polyaddition reaction of the in situ polymerizable phenoxy resin to form the target resin coating layer. In this case, in the components other than the solvent contained in the resin composition, the in situ polymerizable phenoxy resin is preferably a major component. The major component herein means that the content of the in situ polymerizable phenoxy resin is 50 to 100% by mass. The content is preferably 60% by mass or more, and more preferably 80% by mass or more.

The polyaddition reactive compound for providing the in situ polymerizable phenoxy resin is preferably a combination of a bifunctional epoxy resin and a bifunctional phenolic compound.

Examples of the bifunctional epoxy resin include a bisphenol type epoxy resin and a biphenyl type epoxy resin. These may be used alone or as a combination of two or more kinds thereof. Specific examples thereof include "jER (registered trademark) 828", "jER (registered trademark) 834", "jER (registered trademark) 1001", "jER (registered trademark) 1004", and "jER (registered trademark) YX-4000", produced by Mitsubishi Chemical Corporation.

Examples of the bifunctional phenol compound include bisphenol and biphenol. These may be used alone or as a combination of two or more kinds thereof.

Examples of the combination thereof include a bisphenol A type epoxy resin and bisphenol A, a bisphenol A type epoxy resin and bisphenol F, and a biphenyl type epoxy resin and 4,4'-biphenol. Examples thereof also include a combination of "WPE 190" and "EX-991L", produced by Nagase ChemteX Corporation.

The catalyst used for the polyaddition reaction of the in situ polymerizable phenoxy resin is preferably, for example, a tertiary amine, such as triethylamine and 2,4,6-tris(dimethylaminomethyl)phenol; and a phosphorus based compound, such as triphenylphosphine.

The polyaddition reaction is preferably performed by heating to 120 to 200° C. for 5 to 90 minutes while depending on the kind of the reaction compounds and the like. Specifically, the in situ polymerizable phenoxy resin layer can be formed in such a manner that the resin composition is coated, from which the solvent is then appropriately evaporated, and then heated to perform the polyaddition reaction.

(Thermosetting Resin)

In the case where the resin coating layer 4 includes plural layers, at least one layer thereof is also preferably a layer formed of a thermosetting resin (which may be hereinafter referred to as a thermosetting resin layer). Examples of the thermosetting resin include a urethane resin, an epoxy resin, a vinyl ester resin, and an unsaturated polyester resin.

The layers of the thermosetting resin layer may be formed of one kind of the resins alone or may be formed of a mixture of two or more kinds thereof. In alternative, the thermosetting resin layer includes two or more layers of different kinds.

The resin coating layer 4 that has a laminated structure of the in situ polymerizable phenoxy resin layer and the thermosetting resin layer can constitute the composite laminate 1 coated with the resin coating layer 4 that has various characteristics including the strength, the impact resistance, and the like derived from the thermosetting resin.

The order of the lamination of the thermosetting resin layer and the in situ polymerizable phenoxy resin layer is not particularly limited, and in the case where the composite laminate 1 intends to bond the metal base material 2 to the bonding target, the in situ polymerizable phenoxy resin layer is preferably laminated to become the outermost surface of the resin coating layer 4 from the standpoint of the achievement of excellent adhesiveness to the bonding target.

The coating method for forming at least one layer of the resin coating layer 4 with the resin composition containing the thermosetting resin is not particularly limited, and examples thereof include a spray coating method and a dipping method.

The resin composition may contain a solvent and depending on necessity additives, such as a colorant, for sufficiently performing the curing reaction of the thermosetting resin to form the target resin coating layer. In this case, in the components other than the solvent contained in the resin composition, the thermosetting resin is preferably a major component. The major component herein means that the content of the thermosetting resin is 50 to 100% by mass. The content is preferably 60% by mass or more, and more preferably 80% by mass or more.

The thermosetting resin referred in the present invention means widely resins that is cured through crosslinking, and is not limited to a thermal curing type, but encompasses an ordinary temperature curing type and a photocuring type. The photocuring type can be cured within a short period of time through irradiation of visible light or an ultraviolet ray. The photocuring type may be used in combination with the thermal curing type and/or the ordinary temperature curing type. Examples of the photocuring type include a vinyl ester resin, such as "Ripoxy (registered trademark) LC-760" and "Ripoxy (registered trademark) LC-720", produced by Showa Denko K.K.

[Urethane Resin]

The urethane resin is generally a resin obtained through reaction of an isocyanato group and a hydroxy group, and is preferably a urethane resin that corresponds to the definition in ASTM D16 "coating containing polyisocyanate having vehicle nonvolatile content of 10 wt % or more". The urethane resin may be either a one-component type or a two-component type.

Examples of the one-component type urethane resin include an oil modification type (cured through oxidation polymerization of an unsaturated fatty acid group), a moisture curing type (cured through reaction of an isocyanato group and water in air), a block type (cured through reaction of an isocyanato group formed by dissociation of a block agent under heat and a hydroxy group), and a lacquer type (cured through drying by evaporation of a solvent). Among these, a moisture curing one-component type urethane resin is preferably used from the standpoint of the handleability and the like. Specific examples thereof include "UM-50P", produced by Showa Denko K.K.

Examples of the two-component type urethane resin include a catalyst curing type (cured through reaction of an isocyanato group and water in air or the like in the presence of a catalyst) and a polyol curing type (cured through reaction of an isocyanato group and a hydroxy group of a polyol compound).

Examples of the polyol compound in the polyol curing type include a polyester polyol, a polyether polyol, and a phenol resin.

Examples of the isocyanate compound having an isocyanato group in the polyol curing type include an aliphatic isocyanate, such as hexamethylene diisocyanate (HDI), tetramethylene diisocyanate, and a dimer acid diisocyanate; an aromatic isocyanate, such as 2,4- or 2,6-tolylene diisocyanate (TDI) or a mixture thereof, p-phenylene diisocyanate, xylylene diisocyanate, and diphenylmethane diisocyanate (MDI) and polymeric MDI, which is a polynuclear mixture thereof and an alicyclic isocyanate, such as isophorone diisocyanate (IPDI).

The mixing ratio of the polyol compound and the isocyanate compound in the polyol curing two-component type urethane resin is preferably in a range of 0.7 to 1.5 in terms of molar equivalent ratio of (hydroxy group)/(isocyanato group).

Examples of the urethanation catalyst used in the two-component type urethane resin include an amine based catalyst, such as triethylenediamine, tetramethylguanidine, N, N, N',N'-tetramethylhexane-1,6-diamine, dimethyletheramine, N, N, N',N'',N''-pentamethyldipropylenetriamine, N-methylmorpholine, bis(2-dimethylaminoethyl) ether, dimethylaminoethoxyethanol, and triethylamine; and organotin based catalyst, such as dibutyltin diacetate, dibutyltin dilaurate, dibutyltin thiocarboxylate, and dibutyltin dimaleate.

In the polyol curing type, in general, the urethanation catalyst is preferably mixed in an amount of 0.01 to 10 parts by mass per 100 parts by mass of the polyol compound.

[Epoxy Resin]

The epoxy resin is a resin having two or more epoxy groups in one molecule. Examples of the prepolymer before curing of the epoxy resin include an ether based bisphenol type epoxy resin, a novolac type epoxy resin, a polyphenol type epoxy resin, an aliphatic type epoxy resin, an ester based aromatic epoxy resin, an alicyclic epoxy resin, and an ether-ester based epoxy resin, and among these, a bisphenol A type epoxy resin is preferably used. These may be used alone or as a combination of two or more kinds thereof.

Specific examples of the bisphenol A type epoxy resin include "jER (registered trademark) 828" and "jER (registered trademark) 1001", produced by Mitsubishi Chemical Corporation.

Specific examples of the novolac type epoxy resin include "D.E.N. (registered trademark) 438 (registered trademark)", produced by The Dow Chemical Company.

Examples of the curing agent used for the epoxy resin include known curing agents, such as an aliphatic amine, an aromatic amine, an acid anhydride, a phenol resin, a thiol compound, an imidazole compound, and a cationic catalyst. The curing agent as a combination with a long-chain aliphatic amine and/or a thiol compound can provide the effect of providing a large elongation and excellent impact resistance.

Specific examples of the thiol compound include the same compounds as exemplified for the thiol compound in the surface treatment above. Among these, pentaerythritol tetrakis(3-mercaptobutyrate) (e.g., "Karenz MT (registered trademark) PE1", produced by Showa Denko K.K.) is preferred from the standpoint of the elongation and the impact resistance.

[Vinyl Ester Resin]

The vinyl ester resin contains a vinyl ester compound dissolved in a polymerizable monomer (such as styrene). The vinyl ester resin is also referred to as an epoxy (meth) acrylate resin, and encompasses a urethane (meth)acrylate resin.

As the vinyl ester resin, for example, those described in "Polyester Jushi Handbook" (Polyester Resin Handbook) (published by Nikkan Kogyo Shimbun, Ltd., 1988), "Toryo Yougo Jiten" (Paint Terminological Dictionary) (published by Japan Society of Colour Material, 1993), and the like can be used, and specific examples thereof include "Ripoxy (registered trademark) R-802", "Ripoxy (registered trademark) R-804", and "Ripoxy (registered trademark) R-806", produced by Showa Denko K.K.

Examples of the urethane (meth)acrylate resin include a radical polymerizable unsaturated group-containing oligomer obtained in such a manner that an isocyanate compound and a polyol compound are reacted, and then a hydroxy group-containing (meth)acryl monomer (and depending on necessity a hydroxy group-containing allyl ether monomer) is reacted therewith. Specific examples thereof include "Ripoxy (registered trademark) R-6545", Showa Denko K.K.

The vinyl ester resin can be cured through radical polymerization by heating in the presence of a catalyst, such as an organic peroxide.

The organic peroxide is not particularly limited, and examples thereof include a ketone peroxide compound, a peroxyketal compound, a hydroperoxide compound, a diallyperoxide compound, diacylperoxide compound, a peroxyester compound, and a peroxydicarbonate compound. The curing can be performed at ordinary temperature by combining these compounds with a cobalt metal salt or the like.

The cobalt metal oxide is not particularly limited, and examples thereof include cobalt naphthenate, cobalt octylate, and cobalt hydroxide. Among these, cobalt naphthenate and/or cobalt octylate are preferred.

[Unsaturated Polyester Resin]

The unsaturated polyester resin contains a condensation product (i.e., unsaturated polyester) obtained through esterification reaction of a polyol compound and an unsaturated polybasic acid (and depending on necessity a saturated polybasic acid), dissolved in a polymerizable monomer (such as styrene).

As the unsaturated polyester resin, for example, those described in "Polyester Jushi Handbook" (Polyester Resin Handbook) (published by Nikkan Kogyo Shimbun, Ltd., 1988), "Toryo Yougo Jiten" (Paint Terminological Dictionary) (published by Japan Society of Colour Material, 1993), and the like can be used, and specific examples thereof include "Rigolac (registered trademark)", produced by Showa Denko K.K.

The unsaturated polyester resin can be cured through radical polymerization by heating in the presence of a catalyst, as similar to the vinyl ester resin.

[Metal-Resin Bonded Article]

The metal-resin bonded article of the present invention includes the composite laminate 1, the resin coating layer 4 of which is the primer layer as described above, and a resin material bonded and integrated to the surface on the side of the primer layer.

FIG. 2 shows one embodiment of the metal-resin bonded article of the present invention. A metal-resin bonded article shown in FIG. 2 has a composite laminate 1 and a resin material as a bonding target 30A that is in direct contact with and is bonded and integrated to a surface 14 on the side of the resin coating layer (primer layer) of the composite laminate 1.

As described above, the surface of the primer layer has excellent adhesiveness to a bonding target of various materials (such as a metal material and an organic material), particularly a resin material, and therefore a metal-resin bonded article including the metal base material 2 and the resin material, which are bonded to each other with a high adhesion strength, can be favorably obtained.

The thickness (thickness after drying) of the primer layer may depend on the material of the bonding target and the contact area of the bonding part, and is preferably 1 µm to 10 mm, more preferably 2 µm to 8 mm, and further preferably 3 µm to 5 mm, from the standpoint of the achievement of the excellent adhesiveness between the surface on the side of the primer layer and the resin material.

The metal-resin bonded article tends to cause thermal deformation in the process of cooling to room temperature after bonding, depending on the heating temperature in bonding, due to the difference of the thermal expansion coefficients of the metal base material 2 and the bonding target 30A. From the standpoint of the suppression and relief of the thermal deformation, a portion having characteristics with a large elongation having a prescribed thickness is preferably provided between the metal base material 2 and the bonding target 30A. The prescribed thickness can be obtained in consideration of the temperature change in bonding (i.e., the temperature change from the heating temperature in bonding to the cooling to room temperature) and the properties, such as the elongation, of the primer layer.

For example, in the case where an aluminum base material and a carbon fiber-reinforced resin (CFRP) are bonded and integrated to each other, the thickness of the primer layer is preferably 0.1 to 10 mm, more preferably 0.2 to 8 mm, and further preferably 0.5 to 5 mm.

FIG. 3 shows another embodiment of the metal-resin bonded article of the present invention. A metal-resin bonded article shown in FIG. 3 has a composite laminate 1 and a resin material as a bonding target 30B that is bonded and integrated to a surface 14 on the side of the resin coating layer (primer layer) of the composite laminate 1 through an adhesive 31.

As described above, a metal-resin bonded article including the metal base material 2 and the resin material, which are bonded to each other with a high adhesion strength, can be obtained by using the adhesive 31 depending on the kind of the resin material as the bonding target 30B.

The adhesive 31 can be appropriately selected depending on the kind of the resin material as the bonding target 30B, and known adhesives, such as an epoxy resin type, a urethane resin type, and a vinyl ester resin type, can be used.

The metal-resin bonded article tends to cause thermal deformation in the process of cooling to room temperature after bonding, depending on the heating temperature in bonding, due to the difference of the thermal expansion coefficients of the metal base material 2 and the bonding target 30B. From the standpoint of the suppression and relief of the thermal deformation, the thickness of the adhesive layer 31 is preferably such a value that provides a total thickness of the primer layer and the adhesive layer 31 of 0.5 mm or more, and a portion having characteristics with a large elongation having a prescribed thickness is preferably provided between the metal base material 2 and the bonding target 30B. The total thickness can be determined in consideration of the temperature change in bonding (i.e., the temperature change from the heating temperature in bonding to the cooling to room temperature) and the properties, such as the elongation, of the primer layer and the adhesive layer.

The resin material in the metal-resin bonded article is not particularly limited, and may be an ordinary synthetic resin. Examples thereof include resins used in an automobile component, such as a polycarbonate resin, a polyester resin, a modified polyphenylene ether resin, and a polyetherimide resin. Examples thereof also include a carbon fiber-reinforced resin (CFRP), such as a press molded article using carbon fibers, e.g., a sheet molding compound (SMC) and a bulk molding compound (BMC), and a glass fiber-reinforced resin (GFRP).

The SMC described above is a sheet-like molded article obtained by impregnating reinforcing fibers, such as carbon fibers, with a mixture of an unsaturated polyester resin and/or a vinyl ester resin, a polymerizable unsaturated monomer, a curing agent, a shrinkage preventing agent, a filler, and the like.

The method for producing the metal-resin bonded article may include bonding and integrating the composite laminate 1 and the molded article of the resin material, which have been produced individually.

The resin material may be bonded and integrated with the composite laminate 1 simultaneously with the molding of the resin material. Specifically, the metal-resin bonded article may be obtained in such a manner that the resin material is bonded and integrated to the surface on the side of the primer layer of the composite laminate 1 in molding the resin material by a method, such as injection molding, press molding, filament winding molding, hand lay-up molding, and transfer molding. Among these molding methods, injection molding, press molding, filament winding molding, and hand lay-up molding are preferred.

EXAMPLES

Specific examples of the present invention will be described below, but the present invention is not particularly limited to the examples.

Example 1-1

(Surface Treatment Step)

An aluminum plate (A6063) having a dimension of 25 mm×100 mm×1.6 mm in thickness was subjected to an etching treatment by dipping the aluminum plate in a sodium hydroxide aqueous solution having a concentration of 5% by mass for 1.5 minutes, then neutralizing with a nitric acid aqueous solution having a concentration of 5% by mass, washing with water, and drying.

Subsequently, the aluminum plate subjected to the etching treatment was subjected to a boehmite treatment by boiling the aluminum plate in an aqueous solution containing 0.3% by mass of triethanolamine for 3 minutes, so as to form a surface-treated part (i.e., a boehmite film having surface unevenness) on the surface of the aluminum plate.

(Functional Group Adherent Layer Forming Step)

Subsequently, the aluminum plate subjected to the boehmite treatment was dipped in a solution containing a silane coupling agent at 80° C. obtained by dissolving 2.48 g (0.01 mol) of 3-methacryloxypropyltrimethoxysilane ("KBM-503", produced by Shin-Etsu Silicone Co., Ltd., a silane coupling agent) in 1,000 g of industrial ethanol, for 3 minutes. The aluminum plate was taken out and dried, so as to form a functional group adherent layer on the surface of the boehmite film (surface-treated part).

(Resin Coating Layer Forming Step)

Subsequently, a one-component type urethane resin ("UM-50P", produced by Showa Denko K.K.) was coated on the surface of the functional group adherent layer of the aluminum plate by a spraying method to make a thickness after drying of 15 μm, and then the evaporation of the solvent and the curing were performed by allowing to stand in the air at ordinary temperature for 24 hours, so as to form a first layer of the resin coating layer (i.e., a thermosetting resin layer).

Furthermore, an in situ polymerizable phenoxy resin composition obtained by dissolving 100 g of an epoxy resin ("jER (registered trademark) 1004", produced by Mitsubishi Chemical Corporation), 12.6 g of bisphenol A, and 0.45 g of triethylamine in 209 g of acetone was coated on the surface of the thermosetting resin layer by a spray method to make a thickness after drying of 10 μm. The solvent was evaporated by allowing to stand in the air at ordinary temperature for 30 minutes, and then the polyaddition reaction was performed by allowing to stand in a furnace at 150° C. for 30 minutes, followed by cooling to ordinary temperature, so as to form a second layer of the resin coating layer (i.e., an in situ polymerizable phenoxy resin layer).

A composite laminate was thus produced that had, on the surface of the functional group adherent layer, the resin coating layer including two layers, i.e., the thermosetting resin layer having a thickness of 15 μm and the in situ polymerizable phenoxy resin layer having a thickness of 10 μm.

Example 1-2

On a surface of a sheet-like molded article of carbon (carbon fiber) sheet molding compound (carbon SMC) having a thickness of 3 mm (produced by Showa Denko K.K.) (i.e., a bonding target), the composite laminate produced in Example 1-1 was overlapped thereon in such a manner that the side of the resin coating layer thereof was brought into contact with the bonding target (overlap portion: 13 mm×25 mm). A test piece (bonded article) A for a tensile shear adhesion test defined in JIS K6850 (1999) was produced by heating and pressurizing at 140° C. for 5 minutes.

After storing the composite laminate in the air at ordinary temperature for 3 months, a test piece (metal-resin bonded article) B was produced in the same manner as above using the composite laminate after elapse of 3 months.

Comparative Example 1-2

Test pieces A and B (metal-resin bonded articles) were produced in the same manner as in Example 1-2 except that on the surface of the sheet-like carbon SMC sheet, the aluminum plate subjected to the surface treatment step and the functional group adherent layer forming step in Example 1-1 (without the resin coating layer) (Comparative Example 1-1) was overlapped thereon in such a manner that the surface of the surface-treated part was brought into contact with the bonding target.

Example 2-1

(Surface Treatment Step and Functional Group Adherent Layer Forming Step)

After performing the surface treatment step in the same manner as in Example 1-1, a functional group adherent layer was formed in the same manner as in Example 1-1 except that 2.34 g (0.01 mol) of 3-acryloxypropyltrimethoxysilane ("KBM-5103", produced by Shin-Etsu Silicone Co., Ltd., a silane coupling agent), instead of 3-methacryloxypropyltrimethoxysilane, so as to provide an aluminum plate having a functional group adherent layer formed on the surface of the boehmite film (surface-treated surface).

(Resin Coating Layer Forming Step)

Subsequently, a visible light curing type vinyl ester resin ("Ripoxy (registered trademark) LC-720", Showa Denko K.K.) was coated on the surface of the functional group adherent layer of the aluminum plate by a spraying method to make a thickness after drying of 15 μm, and then irradiated with LED light having a wavelength of 385 nm for 10 minutes from the position remote from the surface of the aluminum plate by 2 cm, so as to form a first layer of the resin coating layer (i.e., a thermosetting resin (light curing type) layer) on the surface of the functional group adherent layer 3.

Furthermore, an in situ polymerizable phenoxy resin obtained by dissolving 100 g of an epoxy resin ("jER (registered trademark) 1004", produced by Mitsubishi Chemical Corporation), 12.6 g of bisphenol A, and 0.45 g of triethylamine in 209 g of acetone was coated on the surface of the thermosetting resin layer by a spray method to make a thickness after drying of 10 μm. The solvent was evaporated by allowing to stand in the air at ordinary temperature for 30 minutes, and then the polyaddition reaction was performed by allowing to stand in a furnace at 150° C. for 30 minutes, followed by cooling to ordinary temperature, so as to form a second layer of the resin coating layer (i.e., an in situ polymerizable phenoxy resin layer).

A composite laminate was thus produced that had, on the surface of the functional group adherent layer, the resin coating layer including two layers, i.e., the thermosetting resin layer having a thickness of 15 μm and the in situ polymerizable phenoxy resin layer having a thickness of 10 μm.

Example 2-2

A glass fiber mat (three-ply #450 glass mat) was impregnated with a resin composition (ordinary temperature curing type vinyl ester resin) obtained by mixing 100 g of a vinyl ester resin ("Ripoxy (registered trademark) R-802", produced by Showa Denko K.K.), 0.5 g of cobalt octylate, and 1.5 g of an organic peroxide catalyst ("Curing Agent 328E", produced by Kayaku Akzo Co., Ltd.). Thereafter, the resin composition was cured at ordinary temperature and then subjected to post-curing at 120° C. for 2 hours, so as to produce a flat plate (bonding target) formed of glass fiber-reinforced plastics (GFRP) having a thickness of 3 mm.

Subsequently, an ordinary temperature curing type adhesive was coated on the surface on the side of the resin coating layer of the composite laminate to make a thickness of 30 μm, and the flat plate formed of GFRP was adhered to the coated surface (adhered portion: 13 mm×25 mm). The ordinary temperature curing type adhesive was obtained by mixing 100 g of a bisphenol A type epoxy resin ("jER (registered trademark) 828", produced by Mitsubishi Chemical Corporation), 70 g of pentaerythritol tetrakis(3-mercaptobutyrate) ("Karenz MT (registered trademark) PE1", curing agent, produced by Showa Denko K.K.), and 10 g of 2,4,6-tris(dimethylaminomethyl)phenol.

The adhesive was cured by allowing to stand in the air at ordinary temperature for 24 hours to provide a test piece (metal-resin bonded article) A for a tensile shear adhesion test defined in JIS K6850 (1999).

After storing the composite laminate in the air at ordinary temperature for 3 months, a test piece (metal-resin bonded article) B was produced in the same manner as above using the composite laminate after elapse of 3 months.

Comparative Example 2-2

Test pieces A and B (metal-resin bonded articles) were produced in the same manner as in Example 2-2 except that the ordinary temperature curing type adhesive was coated on the surface of the aluminum plate subjected to the surface treatment step and the functional group adherent layer forming step in Example 22-1 (without the resin coating layer) (Comparative Example 2-1).

[Evaluation of Adhesiveness]

The test pieces A and B produced in Examples and Comparative Examples were measured for the adhesion strength by subjecting to a tensile shear adhesion strength test according to JIS K6850 (1999). The measurement results are shown in Table 1 below.

TABLE 1

| Composite laminate | Example 1-1 | Comparative Example 1-1 | Example 2-1 | Comparative Example 2-1 |
|---|---|---|---|---|
| Metal base material (thickness) | aluminum (1.6 mm) | aluminum (1.6 mm) | aluminum (1.6 mm) | aluminum (1.6 mm) |
| Surface treatment | boehmite | boehmite | boehmite | boehmite |
| Functional group adherent layer | silane coupling agent (KBM-503) | silane coupling agent (KBM-503) | silane coupling agent (KBM-5103) | silane coupling agent (KBM-5103) |
| Resin coating layer First layer (thickness) | thermosetting resin (UM-50P) (15 μm) | — | thermosetting resin (Ripoxy LC-720) (15 μm) | — |
| Resin coating layer Second layer (thickness) | in situ polymerizable phenoxy resin (jER 1004/ bisphenol A) (10 μm) | — | in situ polymerizable phenoxy resin (jER 1004/ bisphenol A) (10 μm) | — |
| Metal-resin bonded article | Example 1-2 | Comparative Example 1-2 | Example 2-2 | Comparative Example 2-2 |
| Adhesive (thickness) | — | — | Ordinary temperature curing type (jER 828/ Karenz MT PE1) (30 μm) | Ordinary temperature curing type (jER 828/ Karenz MT PE1) (30 μm) |
| Bonding target (thickness) | carbon SMC (3 mm) | carbon SMC (3 mm) | GFRP (3 mm) | GFRP (3 mm) |
| Adhesion strength (MPa) | | | | |
| A (immediately after production) | 22 | 9 | 24 | 18 |
| B (after elapse of 3 months) | 23 | 5 | 23 | 8 |

As apparent from Table 1, it was confirmed that the bonded article of the composite laminate of Example 1-1 and the sheet-like molded article of carbon SMC (Example 1-2) had the substantially same high adhesion strengths immediately after the production and after elapse of 3 months from the production.

On the other hand, in the case where the aluminum plate of Comparative Example 1-1 (without the resin coating layer) was used (Comparative Example 1-2), the adhesion strength was lower than in Example 1-2, and the adhesion strength was further lowered for the aluminum plate after elapse of 3 months.

It was confirmed that the bonded article of the composite laminate of Example 2-1 and the flat plate formed of GFRP (Example 2-2) had the substantially same high adhesion strengths immediately after the production and after elapse of 3 months from the production.

On the other hand, in the case where the aluminum plate of Comparative Example 2-1 (without the resin coating layer) was used (Comparative Example 2-2), the adhesion strength was lower than in Example 2-2, and the adhesion strength was further lowered for the aluminum plate after elapse of 3 months.

Example 3-1

(Surface Treatment Step)

The surface treatment step was performed in the same manner as in Example 1-1 using an aluminum plate (A6063) having a dimension of 50 mm×300 mm×1.6 mm in thickness.

(Functional Group Adherent Layer Forming Step)

Subsequently, the aluminum plate subjected to the boehmite treatment was dipped in a solution containing a silane coupling agent at 70° C. obtained by dissolving 2 g of 3-aminopropyltrimethoxysilane ("KBM-903", produced by Shin-Etsu Silicone Co., Ltd., a silane coupling agent) in 1,000 g of industrial ethanol, for 3 minutes. The aluminum plate was taken out and dried, so as to form a functional group adherent layer on the surface of the boehmite film (surface-treated surface).

(Resin Coating Layer Forming Step)

Subsequently, an in situ polymerizable phenoxy resin composition obtained by dissolving 100 g of an epoxy resin ("jER (registered trademark) 1001", produced by Mitsubishi Chemical Corporation), 24 g of bisphenol A, and 0.4 g of triethylamine in 250 g of acetone was coated on the surface of the functional group adherent layer of the aluminum plate by a spraying method to make a thickness after drying of 10 μm, then the solvent was evaporated by allowing to stand in the air at ordinary temperature for 30 minutes, and then polyaddition reaction was performed by allowing to stand in a furnace at 150° C. for 30 minutes, followed by cooling to ordinary temperature, so as to form a first layer of the resin coating layer (i.e., a in situ polymerizable phenoxy resin layer).

Furthermore, the operation of coating a thermosetting resin composition obtained by mixing 100 g of a vinyl ester resin ("Ripoxy (registered trademark) R-6540", produced by Showa Denko K.K., tensile elongation: 20%), 0.5 g of cobalt octylate, and 1.5 g of an organic peroxide catalyst ("Curing Agent 328E", produced by Kayaku Akzo Co., Ltd.) on the surface of the in situ polymerizable phenoxy resin layer by a spray method and then curing at ordinary temperature was repeated several times, so as to form a second layer of the resin coating layer (i.e., a thermosetting resin layer) having a thickness of 2 mm.

A composite laminate was thus produced that had, on the surface of the functional group adherent layer, the resin coating layer including two layers, i.e., the in situ polymerizable phenoxy resin layer having a thickness of 10 μm and the thermosetting resin layer having a thickness of 2 mm.

Example 3-2

A carbon fiber sheet ("Replark (registered trademark) 30", produced by Mitsubishi Chemical Infratec Co., Ltd., unidirectional sheet, areal weight: 300 g/m$^2$, three-ply) was impregnated with a resin composition obtained by mixing 100 g of a vinyl ester resin ("Ripoxy (registered trademark) R-6540", produced by Showa Denko K.K., tensile elongation: 20%) and 1.5 g of an organic peroxide catalyst ("Perbutyl (registered trademark) Z", produced by NOF Corporation), which was then cured at ordinary temperature to produce a flat plate (bonding target) formed of CFRP having a thickness of 3 mm.

An ordinary temperature curing type adhesive was coated on the surface on the side of the resin coating layer of the composite laminate produced in Example 3-1 to make a thickness of 20 μm, and the flat plate formed of CFRP was adhered to the coated surface to produce a metal-resin bonded article. The ordinary temperature curing type adhesive was obtained by mixing 100 g of a bisphenol A type epoxy resin ("jER (registered trademark) 828", produced by Mitsubishi Chemical Corporation), 70 g of pentaerythritol tetrakis(3-mercaptobutyrate) ("Karenz MT (registered trademark) PE1", curing agent, produced by Showa Denko K.K.), and 10 g of 2,4,6-tris(dimethylaminomethyl)phenol.

Comparative Example 3-2

A metal-resin bonded article was produced in the same manner as in Example 3-2 except that the ordinary temperature curing type adhesive was coated on the surface on the side of the functional group adherent layer of the aluminum plate subjected to the surface treatment step and the functional group adherent layer forming step in Example 3-1 (without the resin coating layer) (Comparative Example 3-1).

Example 4-1

A composite laminate was produced in the same manner as in Example 3-1 except that an iron plate having a thickness of 1 mm was used instead of the aluminum plate in Example 3-1.

Example 4-2

A metal-resin bonded article was produced in the same manner as in Example 3-2 using the composite laminate produced in Example 4-1.

Comparative Example 4-2

A metal-resin bonded article was produced in the same manner as in Example 4-2 except that the ordinary temperature curing type adhesive was coated on the surface on the side of the functional group adherent layer of the iron plate subjected to the surface treatment step and the functional group adherent layer forming step in Example 4-1 (without the resin coating layer) (Comparative Example 4-1).

[Evaluation of Thermal Deformation of Metal-Resin Bonded Article]

The metal-resin bonded articles obtained in Examples and Comparative Examples each were stored in a drying furnace at 100° C. for 2 hours, and then observed for the presence of deformation due to heating. The evaluation results are shown in Table 2 below.

TABLE 2

| Composite laminate | Example 3-1 | Comparative Example 3-1 | Example 4-1 | Comparative Example 4-1 |
| --- | --- | --- | --- | --- |
| Metal base material (thickness) | aluminum (1.6 mm) | aluminum (1.6 mm) | iron (1 mm) | iron (1 mm) |

TABLE 2-continued

| | | | | |
|---|---|---|---|---|
| Surface treatment | boehmite | boehmite | boehmite | boehmite |
| Functional group adherent layer | silane coupling agent (KBM-903) | silane coupling agent (KBM-903) | silane coupling agent (KBM-903) | silane coupling agent (KBM-903) |
| Resin coating layer First layer (thickness) | in situ polymerizable phenoxy resin (jER 1001/ bisphenol A) (10 μm) | — | in situ polymerizable phenoxy resin (jER 1001/ bisphenol A) (10 μm) | — |
| Resin coating layer Second layer (thickness) | thermosetting resin (Ripoxy R-6540) (2 mm) | — | thermosetting resin (Ripoxy R-6540) (2 mm) | — |
| Metal-resin bonded article | Example 3-2 | Comparative Example 3-2 | Example 4-2 | Comparative Example 4-2 |
| Adhesive (thickness) | Ordinary temperature curing type (jER 828/ Karenz MT PE1) (20 μm) | Ordinary temperature curing type (jER 828/ Karenz MT PE1) (20 μm) | Ordinary temperature curing type (jER 828/ Karenz MT PE1) (20 μm) | Ordinary temperature curing type (jER 828/ Karenz MT PE1) (20 μm) |
| Bonding target (thickness) | CFRP (3 mm) | CFRP (3 mm) | CFRP (3 mm) | CFRP (3 mm) |
| Thermal deformation | none | observed | none | observed |

As apparent from Table 2, no thermal deformation was confirmed in the metal-resin bonded articles of Examples 3-2 and 4-2. On the other hand, in Comparative Examples 3-2 and 4-2, warpage occurred in the thickness direction of the metal-resin bonded article due to the difference of the thermal expansion coefficients of the CFRP and the metal base material, and thus thermal deformation was observed.

Example 5-1

(Surface Treatment Step)

An aluminum plate (A6063) having a dimension of 18 mm×45 mm×1.5 mm in thickness was subjected to an etching treatment by dipping the aluminum plate in a sodium hydroxide aqueous solution having a concentration of 5% by mass for 1.5 minutes, then neutralizing with a nitric acid aqueous solution having a concentration of 5% by mass, washing with water, and drying.

Subsequently, the aluminum plate subjected to the etching treatment was subjected to a boehmite treatment by boiling the aluminum plate in pure water for 10 minutes, and then baked at 250° C. for 10 minutes, so as to form a surface-treated part (i.e., a boehmite film having surface unevenness) on the surface of the aluminum plate.

(Functional Group Adherent Layer Forming Step)

Subsequently, the aluminum plate subjected to the boehmite treatment was dipped in a solution containing a silane coupling agent at 70° C. obtained by dissolving 2 g of 3-aminopropyltrimethoxysilane ("KBM-903", produced by Shin-Etsu Silicone Co., Ltd., a silane coupling agent) in 1,000 g of industrial ethanol, for 20 minutes. The aluminum plate was taken out and dried, so as to form a functional group adherent layer on the surface of the boehmite film (surface-treated part).

(Resin Coating Layer Forming Step)

Subsequently, an in situ polymerizable phenoxy resin composition obtained by dissolving 100 g of an epoxy resin ("jER (registered trademark) 1001", produced by Mitsubishi Chemical Corporation), 24 g of bisphenol A, and 0.4 g of triethylamine in 250 g of acetone was coated on the surface of the functional group adherent layer of the aluminum plate by a spray method to make a thickness after drying of 90 μm. The solvent was evaporated by allowing to stand in the air at ordinary temperature for 30 minutes, and then the poly-addition reaction was performed by allowing to stand in a furnace at 150° C. for 30 minutes, followed by cooling to ordinary temperature, so as to form a resin coating layer (i.e., an in situ polymerizable phenoxy resin layer).

A composite laminate was thus produced that had, on the surface of the functional group adherent layer, the in situ polymerizable phenoxy resin layer having a thickness of 90 μm as the resin coating layer.

Example 5-2

On the surface on the side of the resin coating layer of the composite laminate produced in Example 5-1, a polycarbonate resin (PC resin) ("Lexan (registered trademark) 121R-111, produced by SABIC) (bonding target) was injection molded with an injection molding machine ("SE100V", produced by Sumitomo Heavy Industries, Ltd., cylinder temperature: 300° C., tool temperature: 110° C., injection speed: 10 mm/sec, peak/holding pressure: 100/80 (MPa/ MPa)), so as to produce a test piece for a tensile test according to ISO 19095 (PC resin, 10 mm×45 mm×3 mm, length of bonded part: 5 mm) (metal-resin bonded article).

Comparative Example 5-2

Injection molding of the PC resin was tried to perform in the same manner as in Example 5-2 on the surface on the side of the functional group adherent layer of the aluminum plate subjected to the surface treatment step and the functional group adherent layer forming step in Example 5-1 (without the resin coating layer) (Comparative Example 5-1), but the PC resin was completely not adhered to the aluminum plate.

Example 6-1

A curing resin composition obtained by dissolving 100 g of a bisphenol A type epoxy resin ("jER (registered trademark) 828", produced by Mitsubishi Chemical Corporation), 70 g of pentaerythritol tetrakis(3-mercaptobutyrate) ("Karenz MT (registered trademark) PE1", curing agent, produced by Showa Denko K.K.), and 10 g of 2,4,6-tris (dimethylaminomethyl)phenol in 344 g of acetone was coated on the aluminum plate subjected to the surface treatment step and the functional group adherent layer forming step in Example 5-1 by a spray method to make a thickness after drying of 5 μm, and then the evaporation of the solvent and the curing were performed by allowing to stand in the air at ordinary temperature for 30 minutes, so as to form a first layer of the resin coating layer (i.e., a thermosetting resin layer).

Furthermore, on the surface of the thermosetting resin layer, an in situ polymerizable phenoxy resin layer was formed to make a thickness of 80 μm in the same manner as in Example 5-1, so as to form a second layer of the resin coating layer.

A composite laminate was thus produced that had, on the surface of the functional group adherent layer, the resin coating layer including two layers, i.e., the thermosetting resin layer having a thickness of 5 μm and the in situ polymerizable phenoxy resin layer having a thickness of 80 μm.

Example 6-2

On the surface on the side of the resin coating layer of the composite laminate produced in Example 6-1, the PC resin (bonding target) was injection molded in the same manner as in Example 5-2, so as to produce a test piece for tensile test (metal-resin bonded article).

Comparative Example 6-2

Injection molding of the PC resin (bonding target) was tried to perform in the same manner as in Example 6-2 on the surface on the side of the resin coating layer of the aluminum plate subjected to the surface treatment step and the functional group adherent layer forming step, and then provided with the first layer of the resin coating layer (thermosetting resin layer) in Example 6-1 (without the in situ polymerizable phenoxy resin layer) (Comparative Example 6-1), but the PC resin was completely not adhered to the aluminum plate.

Example 7-1

(Surface Treatment Step)

An iron plate having a dimension of 18 mm×45 mm×1.5 mm in thickness was degreased with acetone, and subjected to a grinding treatment with sandpaper #100.

(Resin Coating Layer Forming Step)

Subsequently, an in situ polymerizable phenoxy resin composition obtained by dissolving 100 g of an epoxy resin ("jER (registered trademark) 1004", produced by Mitsubishi Chemical Corporation), 12.6 g of bisphenol A, and 0.45 g of triethylamine in 209 g of acetone was coated on the surface of the iron plate subjected to the grinding treatment by a spray method to make a thickness after drying of 70 μm. The solvent was evaporated by allowing to stand in the air at ordinary temperature for 30 minutes, and then the polyaddition reaction was performed by allowing to stand in a furnace at 150° C. for 30 minutes, followed by cooling to ordinary temperature, so as to provide a composite laminate having the in situ polymerizable phenoxy resin layer having a thickness of 70 μm.

Example 7-2

On the surface on the composite laminate produced in Example 7-1, a polybutylene terephthalate resin (PBT resin) ("VALOX (registered trademark) 507", produced by SABIC, containing 30% by mass of glass fibers (OF)) (bonding target) was injection molded with an injection molding machine ("SE100V", produced by Sumitomo Heavy Industries, Ltd., cylinder temperature: 245° C., tool temperature: 80° C., injection speed: 10 mm/sec, peak/holding pressure: 100/80 (MPa/MPa)), so as to produce a test piece for a tensile test according to ISO 19095 (PBT resin, 10 mm×45 mm×3 mm, length of bonded part: 5 mm) (metal-resin bonded article).

Example 8-1

(Surface Treatment Step)

A stainless steel (SUS304) plate having a dimension of 18 mm×45 mm×1.5 mm in thickness was degreased with acetone, and subjected to a grinding treatment with sandpaper #100.

(Functional Group Adherent Layer Forming Step)

Subsequently, the SUS304 stainless steel plate subjected to the grinding treatment was dipped in a solution containing a silane coupling agent at 70° C. obtained by dissolving 2 g of 3-methacryloxypropyltrimethoxysilane ("KBM-503", produced by Shin-Etsu Silicone Co., Ltd., a silane coupling agent) in 1,000 g of industrial ethanol, for 20 minutes. The SUS304 stainless steel plate was taken out and dried, so as to form a functional group adherent layer on the surface of the SUS304 stainless steel plate.

(Resin Coating Layer Forming Step)

A curing resin composition obtained by dissolving 20 g of styrene (ST), 20 g of methyl methacrylate (MMA), and 1.4 g of an organic peroxide catalyst ("Perbutyl (registered trademark) O", produced by produced by Kayaku Akzo Co., Ltd.) in 100 g of a vinyl ester resin ("Ripoxy (registered trademark) R-802", produced by Showa Denko K.K.) was coated on the surface of the functional group adherent layer of the SUS304 stainless steel plate to make a thickness after drying of 5 μm, and then cured by heating in the air to 100° C. for 30 minutes, so as to form a first layer of the resin coating layer (i.e., a thermosetting resin layer).

Furthermore, an in situ polymerizable phenoxy resin composition obtained by dissolving 100 g of an epoxy resin ("jER (registered trademark) 1001", produced by Mitsubishi Chemical Corporation), 21 g of bisphenol F, and 0.4 g of triethylamine in 225 g of acetone was coated on the surface of the surface of the thermosetting resin layer by a spray method to make a thickness after drying of 80 μm. The solvent was evaporated by allowing to stand in the air at ordinary temperature for 30 minutes, and then the polyaddition reaction was performed by allowing to stand in a furnace at 150° C. for 30 minutes, followed by cooling to ordinary temperature, so as to form a resin coating layer.

A metal-resin bonded article was thus produced that had, on the surface of the functional group adherent layer, the resin coating layer including two layers, i.e., the thermosetting resin layer having a thickness of 5 μm and the in situ polymerizable phenoxy resin layer having a thickness of 80 μm.

Example 8-2

On the surface on the side of the resin coating layer of the composite laminate produced in Example 8-1, the PBT resin (bonding target) was injection molded in the same manner as in Example 7-2, so as to produce a test piece for tensile test (metal-resin bonded article).

Example 9-1

(Surface Treatment Step)

A magnesium plate having a dimension of 18 mm×45 mm×1.5 mm in thickness was degreased with acetone, and subjected to a grinding treatment with sandpaper #100.
(Functional Group Adherent Layer Forming Step)

Subsequently, the magnesium plate subjected to the grinding treatment was dipped in a solution containing a silane coupling agent at 70° C. obtained by dissolving 2 g of 3-aminopropyltrimethoxysilane ("KBM-903", produced by Shin-Etsu Silicone Co., Ltd., a silane coupling agent) in 1,000 g of industrial ethanol, for 20 minutes. The magnesium plate was taken out and dried, so as to form a functional group adherent layer on the surface of the magnesium plate.
(Resin Coating Layer Forming Step)

Subsequently, an in situ polymerizable phenoxy resin composition obtained by dissolving 100 g of an epoxy resin ("jER (registered trademark) 1004", produced by Mitsubishi Chemical Corporation), 12.6 g of bisphenol A, and 0.45 g of triethylamine in 209 g of acetone was coated on the surface of the functional group adherent layer of the magnesium plate by a spray method to make a thickness after drying of 100 μm. The solvent was evaporated by allowing to stand in the air at ordinary temperature for 30 minutes, and then the polyaddition reaction was performed by allowing to stand in a furnace at 150° C. for 30 minutes, followed by cooling to ordinary temperature, so as to form a resin coating layer.

A composite laminate was thus produced that had, on the surface of the functional group adherent layer, the in situ polymerizable phenoxy resin layer having a thickness of 100 μm as the resin coating layer.

Example 9-2

On the surface on the side of the resin coating layer of the composite laminate produced in Example 9-1, a polyetherimide resin (PEI resin) ("Ultem (registered trademark)", produced by SABIC) (bonding target) was injection molded with an injection molding machine ("SE100V", produced by Sumitomo Heavy Industries, Ltd., cylinder temperature: 350° C., tool temperature: 150° C., injection speed: 50 mm/sec, peak/holding pressure: 160/140 (MPa/MPa)), so as to produce a test piece for a tensile test according to ISO 19095 (PEI resin, 10 mm×45 mm×3 mm, length of bonded part: 5 mm) (metal-resin bonded article).

[Evaluation of Adhesiveness]

The test pieces (metal-resin bonded articles) obtained in Examples and Comparative Examples each were allowed to stand at ordinary temperature for one day, and then measured for the adhesion strength by subjecting to a tensile shear adhesion strength test according to ISO 19095, 1-4, with a tensile tester (Universal Testing Machine Autograph "AG-IS", produced by Shimadzu Corporation, load cell: 10 kN, tensile rate: 10 mm/min, temperature: 23° C., 50% RH). The measurement results are shown in Table 3 below.

TABLE 3

| Composite laminate | Example 5-1 | Comparative Example 5-1 | Example 6-1 | Comparative Example 6-1 | Example 7-1 | Example 8-1 | Example 9-1 |
|---|---|---|---|---|---|---|---|
| Metal base material (thickness) | aluminum (1.5 mm) | aluminum (1.5 mm) | aluminum (1.5 mm) | aluminum (1.5 mm) | iron (1.5 mm) | SUS304 stainless steel (1.5 mm) | magnesium (1.5 mm) |
| Surface treatment | boehmite | boehmite | boehmite | boehmite | grinding | grinding | grinding |
| Functional group adherent layer | silane coupling agent (KBM-903) | silane coupling agent (KBM-903) | silane coupling agent (KBM-903) | silane coupling agent (KBM-903) | — | silane coupling agent (KBM-503) | silane coupling agent (KBM-903) |
| Resin coating layer First layer (thickness) | in situ polymerizable phenoxy resin (jER 1001/ bisphenol A) (90 μm) | — | thermosetting resin (jER 828/ Karenz MT PE1) (5 μm) | thermosetting resin (jER 828/ Karenz MT PE1) (5 μm) | in situ polymerizable phenoxy resin (jER 1004/ bisphenol A) (70 μm) | thermosetting resin (Ripoxy R-802/ ST/MMA) (5 μm) | in situ polymerizable phenoxy resin (jER 1004/ bisphenol A) (100 μm) |
| Resin coating layer Second layer (thickness) | — | — | in situ polymerizable phenoxy resin (jER 1001/ bisphenol A) (80 μm) | — | — | in situ polymerizable phenoxy resin (jER 1001/ bisphenol F) (80 μm) | — |
| Metal-resin bonded article | Example 5-2 | Comparative Example 5-2 | Example 6-2 | Comparative Example 6-2 | Example 7-2 | Example 8-2 | Example 9-2 |
| Bonding target (thickness) | PC (3 mm) | PC (3 mm) | PC (3 mm) | PC (3 mm) | PBT (GF 30% by mass) (3 mm) | PBT (GF 30% by mass) (3 mm) | PEI (3 mm) |
| Adhesion strength (MPa) | 27 | not adhered | 29 | not adhered | 25 | 30 | 28 |

As apparent from Table 3, it was confirmed that the composite laminates having the resin coating layer formed of the in situ polymerizable phenoxy resin layer (Examples 5-1, 6-1, 7-1, 8-1, and 9-1) each were able to bond the various metal base materials and the various resin materials as the bonding target with a high adhesion strength.

Example 10-1

An aluminum plate (A6063) having a dimension of 100 mm×148 mm×0.25 mm in thickness was subjected to an etching treatment by dipping the aluminum plate in a sodium hydroxide aqueous solution having a concentration of 5% by mass for 1.5 minutes, then neutralizing with a nitric acid aqueous solution having a concentration of 5% by mass, washing with water, and drying.

Subsequently, the aluminum plate subjected to the etching treatment was subjected to a boehmite treatment by boiling the aluminum plate in an aqueous solution containing 0.3% by mass of triethanolamine for 3 minutes, so as to form a surface-treated part (i.e., a boehmite film having surface unevenness) on the surface of the aluminum plate.
(Functional Group Adherent Layer Forming Step)

Subsequently, the aluminum plate subjected to the boehmite treatment was dipped in an aqueous solution containing a silane coupling agent at 70° C. obtained by dissolving 4 g of N-2-(aminoethyl)-3-aminopropyltrimethoxysilane ("KBM-603", produced by Shin-Etsu Silicone Co., Ltd., a silane coupling agent) in 1,000 g of industrial ethanol, for 20 minutes. The aluminum plate was taken out and dried, so as to form a functional group adherent layer on the surface of the boehmite film (surface-treated part).
(Resin Coating Layer Forming Step)

Subsequently, an in situ polymerizable phenoxy resin composition obtained by dissolving 100 g of an epoxy resin ("jER (registered trademark) 828", produced by Mitsubishi Chemical Corporation), 61.6 g of bisphenol A, and 0.6 g of triethylamine in 300 g of acetone was coated on the surface of the functional group adherent layer of the aluminum plate by a spray method to make a thickness after drying of 3 μm. The solvent was evaporated by allowing to stand in the air at ordinary temperature for 30 minutes, and then the polyaddition reaction was performed by allowing to stand in a furnace at 150° C. for 30 minutes, followed by cooling to ordinary temperature, so as to form a resin coating layer.

A composite laminate was thus produced that had, on the surface of the functional group adherent layer, the in situ polymerizable phenoxy resin layer having a thickness of 3 μm as the resin coating layer.

Example 10-2

A two-component type urethane adhesive was coated on the surface on the side of the resin coating layer of the composite laminate produced in Example 10-1 to make a thickness after drying of 2 μm, and a polypropylene (PP) film having a thickness of 80 μm (bonding target) subjected to a corona discharge treatment was overlapped on the coated surface, which were bonded under pressure with a roll press (80° C.×30 kg/cm², adhesion speed: 76.7 m/min), so as to produce a metal-resin bonded article. The two-component type urethane adhesive used was an adhesive obtained by mixing 100 g of "Vinylol (registered trademark) OLY-5438-6", 5.45 g of "Vinylol (registered trademark) OLX-7872", and 10 g of "Vinylol (registered trademark) Catalyst Liquid B", all produced by Showa Denko K.K.

Comparative Example 7-2

A metal-resin bonded article was produced by bonding the PP film (bonding target) under pressure in the same manner as in Example 10-2 except that the two-component urethane adhesive was coated on the surface of the aluminum plate subjected to the surface treatment step and the functional group adherent layer forming step in Example 10-1 (without the resin coating layer) (Comparative Example 7-1).
[Evaluation of Adhesiveness]

The metal-resin bonded articles obtained in Example and Comparative Example each were allowed to stand in the air at 40° C. for one day, and then test pieces (80 mm×120 mm) cut therefrom each were measured for the adhesion strength by subjecting to a 180° peeling test according to JIS Z0237 (2009). The measurement results are shown in Table 4 below.

TABLE 4

| Composite laminate | Example 10-1 | Comparative Example 7-1 |
|---|---|---|
| Metal base material (thickness) | aluminum (0.25 mm) | aluminum (0.25 mm) |
| Surface treatment | boehmite | boehmite |
| Functional group adherent layer | silane coupling agent (KBM-603) | silane coupling agent (KBM-603) |
| Resin coating layer (thickness) | in situ polymerizable phenoxy resin (jER 828/ bisphenol A) (3 μm) | — |

| Metal-resin bonded article | Example 10-2 | Comparative Example 7-2 |
|---|---|---|
| Adhesive (thickness) | two-component urethane based (Vinylol OLY-5438-6/ Vinylol OLX-7872/ Vinylol Catalyst Liquid B) (2 μm) | two-component urethane based (Vinylol OLY-5438-6/ Vinylol OLX-7872/ Vinylol Catalyst Liquid B) (2 μm) |
| Bonding target (thickness) | PP (80 μm) | PP (80 μm) |
| Adhesion strength (N/15 mm) | 31 | 21 |

As apparent from Table 4, the metal-resin bonded article of Example 10-2 had an adhesion strength of 31 N/15 mm, and the bonded article of Comparative Example 7-2 had an adhesion strength of 21 N/15 mm. It was confirmed therefrom that a higher adhesion strength was obtained by forming the in situ polymerizable phenoxy resin layer as the resin coating layer.

INDUSTRIAL APPLICABILITY

The composite laminate of the present invention may be bonded and integrated, for example, to another material (e.g., a component), such as a steel material, an aluminum material, and CFRP, and can be used, for example, as automobile components, such as a door side panel, an engine hood, a roof, a tailgate, a steering hanger, an A pillar, a B pillar, a C pillar, a D pillar, a crush box, a power control unit (PCU) housing, an electric compressor component (such as an inner wall, an intake port, an exhaust control valve (ECV) insertion part, and a mount boss), a lithium ion battery (LIB) spacer, a battery case, and an LED head lamp.

Furthermore, the composite laminate of the present invention may be bonded and integrated, for example, to a resin material, such as a polycarbonate molded article, and can be used, for example, as a chassis of a smartphone, a chassis of a notebook personal computer, a chassis of a tablet personal computer, a chassis of a smartwatch, a chassis of a large-size liquid crystal display television set (LCD-TV), and a chassis of an outdoor LED illumination, but the applications are not limited to these examples.

REFERENCE SIGN LIST

1: composite laminate
2: metal base material
2a: surface-treated part
3: functional group adherent layer
4: resin coating layer
14: surface of resin coating layer (primer layer)
30A, 30B: bonding target (resin material)
31: adhesive

The invention claimed is:

1. A composite laminate comprising a metal base material and one layer or plural layers of a resin coating layer laminated on the metal base material,
the resin coating layer being laminated on a surface-treated surface of the metal base material,
at least one layer of the resin coating layer being formed by polyaddition reaction of a resin composition containing an in situ polymerizable phenoxy resin on the surface-treated surface of the metal base material.

2. The composite laminate according to claim 1,
wherein the resin coating layer includes plural layers, at least one layer of which is formed of a resin composition containing a thermosetting resin, and
the thermosetting resin is at least one selected from the group consisting of a urethane resin, an epoxy resin, a vinyl ester resin, and an unsaturated polyester resin.

3. The composite laminate according to claim 1,
wherein the composite laminate comprises a functional group adherent layer between the surface-treated surface of the metal base material and the resin coating layer, the functional group adherent layer is laminated in contact with the metal base material and the resin coating layer, and
the functional group adherent layer has a functional group introduced from at least one selected from the group consisting of a silane coupling agent, an isocyanate compound, and a thiol compound.

4. The composite laminate according to claim 1, wherein the surface-treated surface is formed by a surface treatment which is at least one selected from the group consisting of a blast treatment, a grinding treatment, an etching treatment, and a chemical conversion treatment.

5. The composite laminate according to claim 4, wherein the metal base material contains aluminum, and the surface treatment includes at least one of the etching treatment and the chemical conversion treatment, wherein the chemical conversion treatment is a boehmite treatment.

6. The composite laminate according to claim 1, wherein the metal base material contains aluminum.

7. The composite laminate according to claim 1, wherein the metal base material contains a metal selected from the group consisting of iron, titanium, magnesium, a stainless steel, and copper.

8. The composite laminate according to claim 1, wherein the resin coating layer is a primer layer.

9. A metal-resin bonded article comprising the composite laminate according to claim 8 and a resin material bonded and integrated to a surface on a side of the primer layer of the composite laminate.

10. A method for producing the metal-resin bonded article according to claim 9, comprising
bonding and integrating the resin material to a side of the primer layer of the composite laminate, through molding the resin material by at least one method selected from the group consisting of injection molding, press molding, filament winding molding, and hand lay-up molding.

11. A method for producing the composite laminate according to claim 1, comprising
subjecting the resin composition containing the in situ polymerizable phenoxy resin to polyaddition reaction on the surface-treated surface of the metal base material, so as to form at least one layer of the resin coating layer.

12. The method for producing the composite laminate according to claim 11, wherein the surface treatment is at least one selected from the group consisting of a blast treatment, a grinding treatment, an etching treatment, and a chemical conversion treatment.

13. The method for producing the composite laminate according to claim 11, further comprising, before forming the resin coating layer, treating the surface-treated surface of the metal base material with at least one selected from the group consisting of a silane coupling agent, an isocyanate compound, and a thiol compound, so as to form a functional group adherent layer.

14. The composite laminate according to claim 1, wherein the resin composition further contains a catalyst.

15. The composite laminate according to claim 14, wherein the catalyst is a tertiary amine.

16. The composite laminate according to claim 14, wherein the catalyst is a phosphorus based compound.

17. The composite laminate according to claim 14, wherein the catalyst is triethylamine.

18. The composite laminate according to claim 14, wherein the catalyst is 2,4,6-tris(dimethylaminomethyl)phenol.

19. The composite laminate according to claim 14, wherein the catalyst is triphenylphosphine.

* * * * *